April 10, 1951 H. O. PETERSON 2,548,814

FREQUENCY SHIFT SIGNALING

Filed May 29, 1946 3 Sheets-Sheet 1

INVENTOR
HAROLD O. PETERSON
BY H. S. Grover
ATTORNEY

INVENTOR
HAROLD O. PETERSON
BY H. S. Grover
ATTORNEY

April 10, 1951 H. O. PETERSON 2,548,814

FREQUENCY SHIFT SIGNALING

Filed May 29, 1946 3 Sheets-Sheet 3

INVENTOR
HAROLD O. PETERSON
BY
H. S. Grover
ATTORNEY

Patented Apr. 10, 1951

2,548,814

UNITED STATES PATENT OFFICE 2,548,814

FREQUENCY SHIFT SIGNALING

Harold O. Peterson, Riverhead, N. Y., assignor to Radio Corporation of America, a corporation of Delaware Application May 29, 1946, Serial No. 672,973

5 Claims. (Cl. 250—8)

This application discloses an improved frequency shift transmitter. The object of my invention is to improve frequency shift signaling by reducing the effects of delay echo in the receiver due to transmission of the signal over two paths. The effect of multipath echo on a frequency shift keyed signal is to cause serious distortion which limits the maximum keying speed when multipath echo is present. The means, for reducing the effects of multipath echo, of my invention are incorporated in the transmitter.

Figure 1:
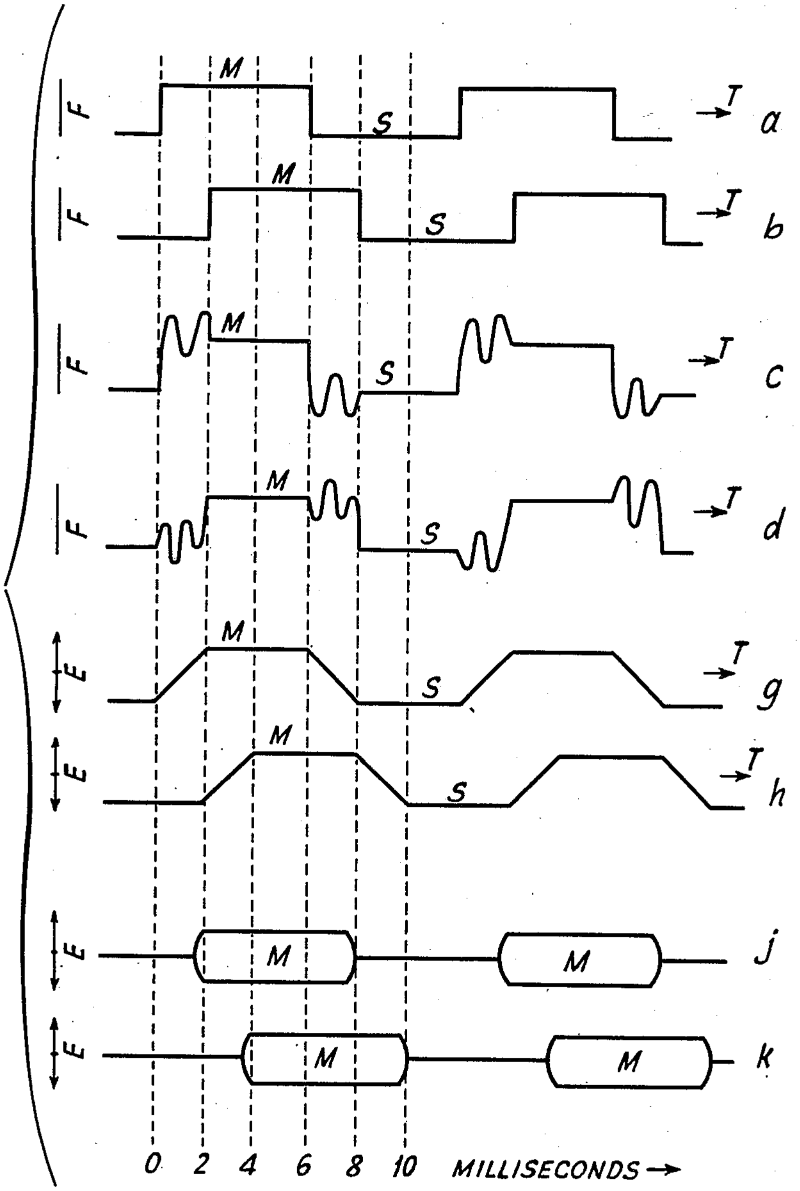

In describing my invention reference will be made to the attached drawings wherein Figure 1 illustrates by curves the manner in which multipath echo acts in a frequency shift receiver to cause distortion in the recorded signal.

Figure 6A:
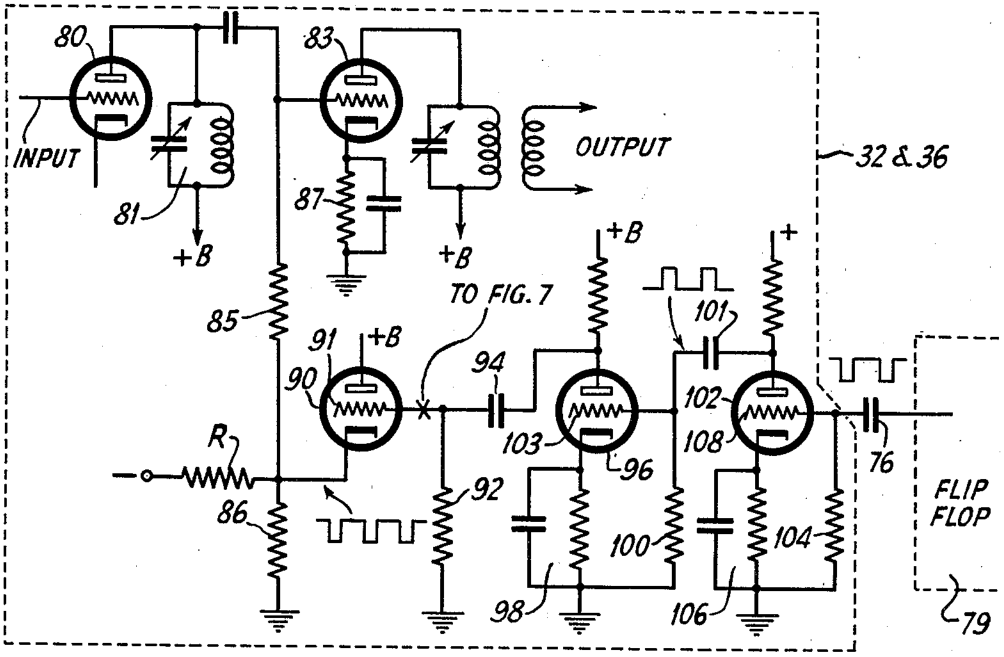
Figure 7:
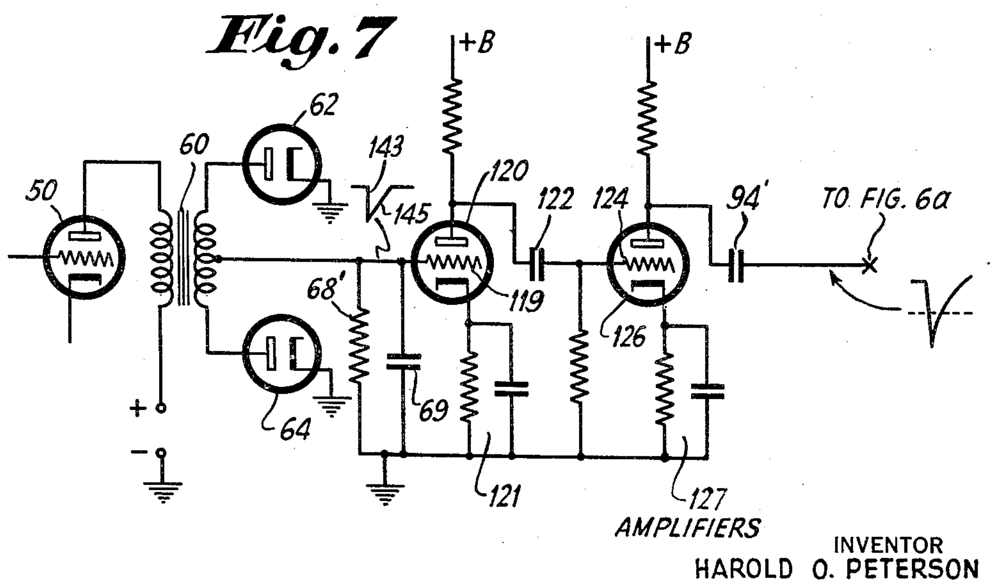

Figures 2, 3, 4 and 5 illustrate by curves the manner in which multipath echo effects are eliminated so that when present, receiver output will be undistorted and the recorded signal will be clear and readible; while Figures 6, 6*a* and 7 illustrate frequency shift transmitters arranged in accordance with my invention.

In operating a frequency shift receiver as disclosed in Schock et al. U. S. Application Serial No. 632,978, filed December 5, 1945, now Patent #2,515,668, dated July 18, 1950, it was found that in the frequency shift transmission from California to Riverhead, New York, echo delays on the order of two milliseconds were present during the hours from about 8 a. m. to 11 a. m. Eastern Standard Time. During these hours a maximum of two milliseconds variation of signal timing was observed. These observations were made with a cathode ray oscilloscope at Riverhead. The ends of the transmission circuit were locked in synchronism with Point Reyes and Riverhead frequency standards. These frequency standards include quartz crystal controlled oscillators.

As stated above, the observations were made with a cathode ray oscilloscope connected to different points in the receiver to determine the effects of the different parts of the receiving system. Indications were that the amount of echo delay was not to any significant extent due to the characteristics of the trigger circuit in the signal strength comparing, trigger circuit controlling, and gating tube controlling apparatus of the said application. Instead, this variation of signal timing appears to be inherent in the system of frequency shift signaling.

The effects of this echo delay due to multipath transmission for a simplified case has been illustrated in Figure 1. In these diagrams of Figure 1 lines *a* and *b* represent the frequency shift signal on reversals coming in over two paths. In these lines signal frequency is plotted against time. The signal over path *b* is (assumed and) indicated to have arrived two milliseconds later than the signal over path *a*. This is indicated by the scale at the bottom of Figure 1, graduations being in milliseconds.

Both the path *a* and path *b* signals are presented in the receiver, one or the other being the stronger depending on momentary conditions in the two paths. Moreover in the receiver of said application both signals enter the current amplitude limiter which precedes the discriminator, detector, gating tubes and so forth. During the indicated time intervals 0 to 2 and 6 to 8 milliseconds, both mark and space frequencies are present in the limiter input. When the path *a* signal is slightly stronger than the path *b* signal the time frequency plot of the signal at the limiter output is as shown in line *c*. When the signal on path *b* is a little stronger than the signal on path *a* the signal at the limiter output is as represented in line *d*. This is because the weaker signal may be considered to modulate, in the limiter, the stronger signal as pointed out in my U. S. Patent #2,246,184 and in Hansell U. S. Patent 2,388,053. The alternating current representing the signal on path *b* modulates the phase or frequency of the stronger alternating current on the path *a* during the time 0 to 2 milliseconds so that the limiter output varies in frequency as illustrated in line *c*. This modulation also takes place during the time 6 to 8 milliseconds. Modulation of the signal on path *b* takes place during these same times when this signal is the strongest as illustrated in line *d*.

The limiter output is passed in sequence through a discriminator, a rectifier, and a low pass filter. The output of the low pass filter is represented by lines *g* and *h*. Line *g* represents the condition in which the path *a* signal is stronger and line *h* represents the condition in which the path *b* is the stronger. The output of the low pass filter actuates the trigger circuit which in turn controls the output of the tone keyer. The trigger operates when the output of the low pass filter reaches a value about 25% short of the extreme voltage swing in either direction. This results in a tone keyer output represented by envelope traces as indicated in lines *j* and *k*. The envelope of line *j* is the output when the path *a* signal is the stronger and the envelope of line *k* is the output when the signal of path *b* is the stronger. The timing of lines *j* and $k$ signal elements differ by 2 milliseconds in the example given. The example given is merely by way of illustration and it will be understood that the delay may be different in different receivers and at different parts of the day and may vary from time to time.

As stated above these diagrams lines $a$ to $h$ of Figure 1 represent a much simplified condition. Under some conditions there will be more than two paths present. However, the observations indicate that the operation of the portion of the signal element between 4 and 8 milliseconds on the time scale of these diagrams will be reliable in this particular example. In the case of CW telegraph, it is possible to compensate for multipath elongation by using "light" marking bias at the transmitter. The net results appear to be that one may expect frequency shift telegraphy will not carry signaling quite as fast as CW telegraphy when multipath echo is bad and is the limiting factor. On the other hand, where signal to noise ratio is the limiting factor frequency shift telegraphy is considerably superior to CW telegraphy and has been measured to yield a gain of about 10 db as compared to CW telegraphy.

In operation, the best frequency shift telegraphy results are had if the signal is sent with no telegraph bias. In other words, the reversals should be sent with 50% mark. When there is telegraph bias there will be a shorter length of either the mark or the space intervals which is reliable. That is to say the overlapping portions on the transmissions from the two paths will be larger. Loss in length of either the mark or space intervals is equally serious.

The primary object of my invention is to reduce or eliminate the effects of echo delay on the recorded signal. This object is accomplished by simultaneously keying the frequency shift transmitter on and off as the frequency is shifted so that each mark interval and each space interval is cut short by an amount equal in time to the multipath delay echo time. This allows the echo to clear itself so that there is no period in which both mark and space frequency are present simultaneously in the receiver and particularly in the limiter input. In Figure 6 I have shown a transmitter including means for keying the transmitter off for adjustable time intervals between mark and space and space and mark conditions. Then at the end of each mark element and at the end of each space element there is a short time period during which no energy is radiated.

Figure 2:
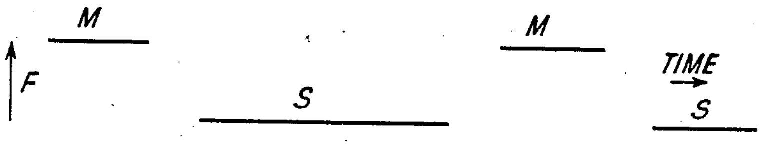
Figure 3:
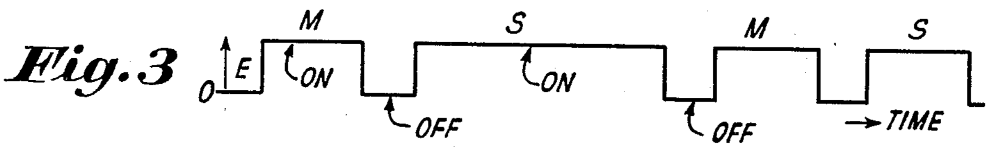

In Figure 2, I show the time frequency plot of the radiated signal in such a system. It will be noted that mark and space are transmitted on two frequencies as usual in frequency shift systems. Figure 2 shows a period of no radiation between each mark and space transmission. In Figure 3 voltage is plotted against time whereas in Figure 2 frequency is plotted against time. During the gap following a mark transmission the mark echo will be received and during the gap following the space transmission the space frequency echo will be received at the receiver. Since the space element does not start until the mark echo has died out and the mark element does not start until the space echo has died out no distortion can result in the receiver. The transmitter should be adjusted so that the length of the gap is equal to the echo delay time being experienced on the radio circuit. This type of signal may be received with the conventional frequency shift receiver such as the diversity receiver of the above identified application.

Figure 4:
Figure 5:
Figure 5:
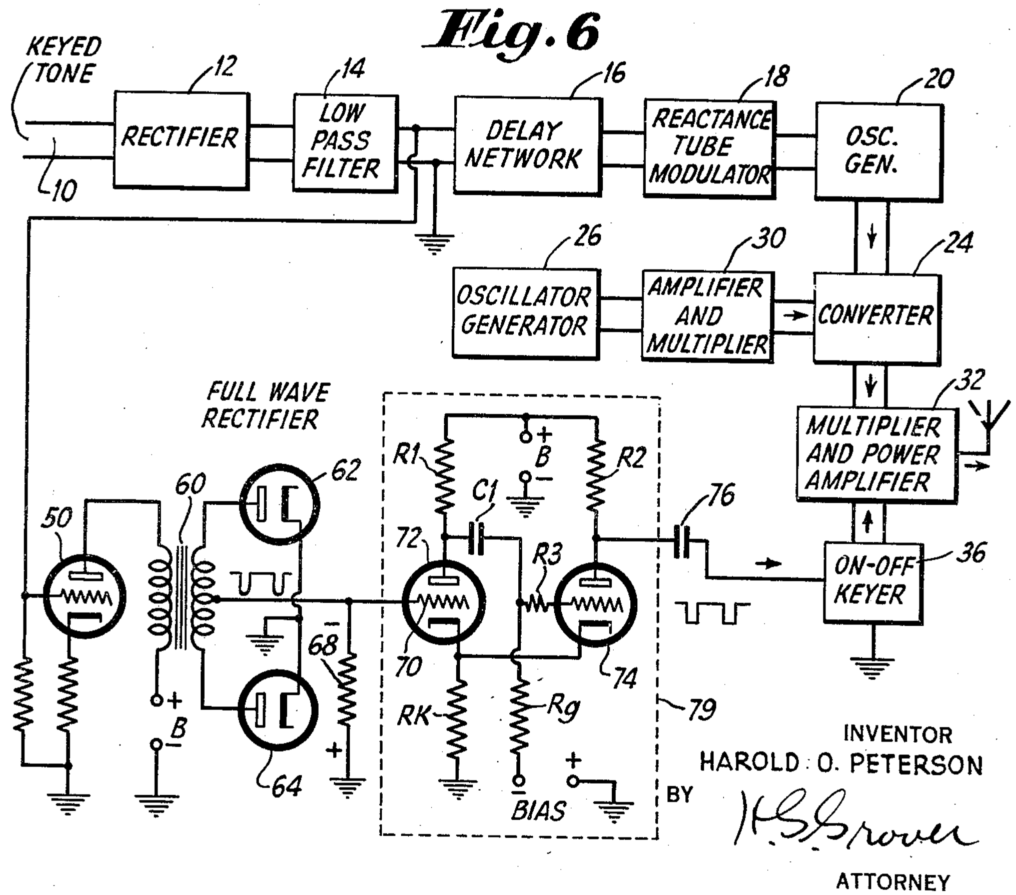

In Figure 6 keyed tone from any source such as for example from a central office comes in on line 10 and is supplied to a tone rectifier 12 wherein the tone is rectified to derive output having a strong alternating current component that follows in amplitude the mark and space signals used to key the received tone. This rectified output is impressed on a low pass filter 14 wherein the alternating current components exceeding the fundamental keying frequency are removed. The filtered alternating current may be supplied through a delaying network 16 to reactance tube modulator 18. The reactance tube modulator 18 is connected with an oscillation generator 20 which may be of relatively low frequency, say, for example, 200 kc. The circuits in units 12, 14, 16, 18 and 20 may be conventional and need be described in detail herein. However, the reactance tube in 18 is controlled by the keying potentials and operates to shift the frequency of the oscillations generated in 20 from one frequency indicating mark to another frequency indicating space. Mark and space frequency may be separated several hundred cycles at the transmitter output. The frequency shifted oscillations from unit 20 are fed to a converter 24 which is also excited by output from a stabilized oscillator in unit 26 amplified and multiplied as desired in a unit 30 to supply a stable high frequency output of the order of say 2 mc. to the converter 24. The high frequency oscillations are modulated in 24 by the frequency shifted oscillations from unit 20. The output of the converter 24 comprises various frequencies including the sum and difference frequencies of the two sources connected to the input of the converter. Either the sum or the difference frequency energy in the converter output may be selected by frequency selective circuits therein or in unit 32 and amplified and multiplied in frequency in unit 32 and supplied therefrom to the antenna. An on-off keyer is provided at 36 which operates on the electrical circuits in unit 32 to key on and off the transmitter signal to produce the desired gaps in the output thereof. One way in which these gaps may be introduced is shown in Figure 6 and may be explained as follows:

The output of the low pass filter in unit 14 has the wave form shown in Figure 4. This current of varying magnitude representing mark and space is supplied to the grid of a coupling and amplifier tube 50 which has in its anode circuit the primary winding of a pulse transformer 60. Energy of the wave form shown in Figure 4 will flow in this primary winding since the tube 50 is operated as a class "a" amplifier. The secondary winding of the transformer is coupled in push-pull relation to a pair of rectifier tubes 62 and 64 to provide full wave rectification. When the plate current of tube 50 changes, voltage pulses are induced in the secondary winding of the transformer 60, or in other words, the pulsating energy of Fig. 4 is differentiated by transformer 60. These voltage pulses will be as indicated in Figure 5 and when rectification takes place in the full wave rectifier system including tubes 62 and 64 negative pulses are caused to flow in the rectifier load resistor 68. These pulses will have the form indicated over the connection to resistor 68 and to the grid 70 of tube 72. The tube 72 is connected with tube 74 in a flip-flop or triggering circuit which has the characteristic of triggering each time a negative pulse is applied to its grid 70. The trigger circuit including tubes 72 and 74 is self-restoring. That is to say when a negative pulse is applied to the grid 70, the circuit will flip to a condition in which tube 72 is non-conductive and tube 74 is conductive. The tubes will remain in this condition for a time period depending mainly upon the magnitudes of the grid resistor R$g$, R3 and capacitor C1. Then the trigger circuit will flip back to its stable condition, that is, with tube 72 conducting and tube 74 non-conductive. The tubes 72 and 74 have different cut off biases, supplied by grid resistors 68 and R$g$ and common cathode resistor R$k$. When current flows in the tube 72 the potential drop in R$k$ appears on the cathodes of tubes 72 and 74. This change in potential is sufficient to bias tube 74 to cut off but does not cut off tube 72. When the negative pulses are applied to the grid of tube 72, plate current is cut off in tube 72 making the plate potential more positive and making the cathode of tube 74 less positive so that its grid is relatively less negative and current flows in the tube 74. This condition holds for the duration of the negative pulse on the grid 70 of tube 72 plus an adjustable time period measured by the circuit elements. When tube 72 is cut off by the negative pulse its anode potential rises to charge condenser C1. This charge leaks off to allow the potential on the anode of tube 72 to become less positive and the potential on the grid of tube 74 to become more negative to flip the circuit to its original condition.

The output of this flip-flop circuit is of square wave pulse form the pulse length of which may be adjusted by adjusting the circuit constants. The pulse of square wave form is fed to condenser 76 and operates through an on-off keyer in unit 36 to shut off the transmitter. Notice that the transmitter is shut off at the end of each mark element and at the end of each space element and is turned on after a time period has elapsed after the end of each mark element and of each space element sufficient to eliminate transmitter output on mark or on space during the period of overlap due to delay echo effects. Thus a gap of no radiation results each time the control signal shifts from mark to space or from space to mark.

In Figure 6$a$ I show one circuit arrangement for keying the transmitter on and off each time the control signal shifts from mark to space or from space to mark. In this figure the units 32 and 36 of Figure 6 are combined. The amplifier and multiplier stages (unit 32) may include a tube 80 with a tuned output circuit 81 feeding frequency multiplied and amplified currents to a stage including tube 83 which may be the final stage or an intermediate stage. The output of stage 83 is supplied to the antenna or to additional stages and then to the antenna. The tube 83 has its control grid biased by a circuit including resistors 85 and 86 connecting the control grid to ground. The cathode of the tube is connected to ground by a resistor and capacitor unit 87. An additional electron discharge device 90 has its cathode connected to ground through the resistor 86 and its control grid 91 coupled to ground by a grid biasing resistor 92, and the grid 91 is also coupled by a capacitor 94 to the anode of an amplifying and phase reversing tube 96. The tube 96 has a cathode resistor and capacitor unit 98 and a grid biasing resistor 100. This tube has its control grid coupled by condenser 101 to the anode of a stage including tube 102 connected in a manner similar to that in which tube 96 is connected. The control grid of tube 102 is biased by resistor 104 and cathode resistor and capacitor unit 106. The control grid of tube 102 is also coupled to the condenser 76 supplying the triggering circuit output.

When the tube 74, that is the last triggering circuit tube, becomes conductive the potential at the end of the condenser 76 adjacent the grid 108 of tube 102 becomes more negative to reduce the plate current in this tube so that the potential at the anode of tube 102 becomes more positive. When the potential at the anode of tube 102 rises the potential at the grid 103 of tube 96 rises and the plate current in this tube increases so that the potential at the anode of tube 96 becomes more negative. This decreasing potential is applied by the condenser 94 to the control grid 91 of the tube 90 to reduce the current flow therein. The tube 90 is of the cathode follower type so that when the current flow therein is reduced the potential at the cathode also falls or becomes more negative and this negative potential is applied through the resistor 85 to the control grid of tube 83 to bias this tube negative to cut-off. The potentials applied to the grid 108 are represented above the grid lead. The potentials at the anode of tube 102 and at the grid of tube 96 are represented above the lead to the grid 103 of this tube. The potentials at the cathode of the tube 90 are represented adjacent the cathode lead to resistor 86. This curve may also represent the potentials at the grid of the tube 90. Note that each time the transmitter is keyed from mark to space and from space to mark transmitter output is cut off.

The delay circuit in 16, which may be another low pass filter, is introduced to allow for the amount of delay which may be introduced by the circuits including tubes 50, 62, 64, 72 and 74 used for producing the control potentials causing the gaps in the transmitted wave.

Other alternatives of this circuit will be obvious. For instance, the pulses out of the rectifier load resistor 68 may be used to quickly charge a condenser which discharges through a resistor, resulting in pulses having a saw-tooth shape. These pulses of saw-tooth wave form may be impressed on a tube biased so that the transmitter will be turned off at a fixed threshold value, thus affording the means for adjusting the length of the gaps without the use of a trigger circuit. This modification is illustrated in Figure 7 of the drawings.

The embodiment described briefly above is shown in Figure 7 of the drawing. In this embodiment the triggering circuit included in rectangle 79 of Figure 6 and the stages including tubes 102 and 96 of Figure 6$a$ are omitted. The full wave rectifier output appearing across resistor 68′ is fed over a condenser 69 to the control grid 119 of a tube 120. The anode of this tube is coupled by a capacitor 122 to the control grid 124 of an additional stage including tube 126. The anode of the tube 126 is coupled by condenser 94′ to the control grid 91 of the tube 90 (Fig. 6$a$). The tubes 120 and 126 have cathode resistor and capacitor units 121 and 127 respectively and these stages are amplifiers all operating in substantially the same manner as will be described hereinafter. The output of the final stage 126 goes to the multiplier and power amplifier circuits in unit 32. In practice this lead is connected at the point X in Figure 6$a$ between the condenser 94 and control grid 91 so that the stages in Figure 7 operate to bias the tube 83 to cut off each time the frequency of the transmitter is shifted from space to mark and from mark to space as described hereinbefore in connection with Figures 6 and 6*a*.

The negative pulses appearing across the condenser 69 charge this condenser up fast because the impedance of the charging path is relatively low. The charging path includes the diodes 62 and 64 and the secondary winding of transformer 60. The discharge of the condenser 69 is slow because this path includes the resistor 68' which is large. The negative pulses which occur each time the frequency of the transmitter wave is changed are thus converted into potentials as indicated above condenser 69. When a negative pulse appears the negative charge on condenser 69 builds up rapidly as indicated at 143 of this curve and falls off slowly at the end of the pulse as indicated at 145 of this curve. The stages 120 and 126 amplify these pulses to supply at the output condenser 94' and to the grid 91 of tube 90 a similarly varying potential which cuts off the tube 83 each time the frequency of operation of the transmitter is changed.

I claim:

1. In a signaling system, a source of pulse energy representing different signaling conditions, an oscillation generator, means for modulating the frequency of the oscillations generated between two values in accordance with the pulse energy, an amplifier coupled to said last named means, and means for turning said amplifier off for an adjustable time period between shifts in the frequency of the oscillatory energy including a rectifier, coupling means between said source of pulse energy and said rectifier including a differentiating circuit, and a second coupling between the output of said rectifier and said amplifier.

2. A system as recited in claim 1 wherein said second coupling includes a trigger circuit controlled by the output of said rectifier.

3. In a signaling system, a source of pulse energy representing different signaling conditions, an oscillation generator, means for modulating the frequency of the oscillations generated between two values in accordance with the pulse energy, a second high frequency oscillator, means for modulating oscillatory energy from said second high frequency oscillator in accordance with modulated oscillations from said oscillation generator, an amplifier coupled to said last named means, and means for turning said amplifier off for an adjustable time period between shifts in the frequency of the oscillatory energy including a transformer having a primary winding excited by said pulse energy and having a secondary winding in a rectifier circuit, a keyer coupled to said amplifier, and a locking circuit coupling said rectifier to said keyer.

4. In a signaling system, a source of pulse energy representing different signaling conditions, an oscillation generator, means for modulating the frequency of the oscillations generated between two values in accordance with the pulse energy, an amplifier coupled to said last named means, and means for turning said amplifier off for an adjustable time period between shifts in the frequency of the oscillatory energy including a transformer having a primary winding excited by said pulse energy and having a secondary winding in a rectifier circuit, a keyer coupled to said amplifier, and a wave forming circuit coupling said rectifier to said keyer.

5. A system as recited in claim 1 wherein said second coupling includes a capacitor shunted by a resistor in the rectifier output, the impedance of the capacitor charging path, including the rectifier, being low and the impedance of said resistor being large, so that the capacitor is charged rapidly by the rectifier output and discharges slowly through said resistor, and connections coupling said capacitor to said amplifier.

HAROLD O. PETERSON.

REFERENCES CITED

The following references are of record in the file of this patent:

UNITED STATES PATENTS

| Number | Name | Date |
|---|---|---|
| 1,361,522 | Espenschied | Dec. 7, 1920 |
| 1,875,165 | Schroter | Aug. 30, 1932 |
| 1,984,151 | Bailey | Dec. 18, 1934 |
| 2,185,192 | Hansell | Jan. 2, 1940 |
| 2,233,183 | Roder | Feb. 25, 1941 |
| 2,282,102 | Tunick | May 5, 1942 |
| 2,294,129 | Purington | Aug. 25, 1942 |
| 2,299,388 | Hansell | Oct. 20, 1942 |
| 2,358,382 | Carlson | Sept. 19, 1944 |
| 2,378,299 | Hilferty | June 12, 1945 |
| 2,445,618 | Hutcheson | July 20, 1948 |
| 2,449,819 | Purington | Sept. 21, 1948 |

FOREIGN PATENTS

| Number | Country | Date |
|---|---|---|
| 537,382 | Germany | June 30, 1933 |
| 472,580 | Great Britain | Sept. 27, 1937 |